(12) United States Patent
Ilalaole

(10) Patent No.: US 7,870,868 B1
(45) Date of Patent: Jan. 18, 2011

(54) WATER CONSERVATION KIT

(76) Inventor: Gary K. Ilalaole, PMB 236, 111 Hekili St., Suite A, Kailua, HI (US) 96734

( * ) Notice: Subject to any disclaimer, the term of this patent is extended or adjusted under 35 U.S.C. 154(b) by 813 days.

(21) Appl. No.: 11/796,523

(22) Filed: Apr. 26, 2007

Related U.S. Application Data

(60) Provisional application No. 60/795,337, filed on Apr. 26, 2006.

(51) Int. Cl.
*E04D 13/04* (2006.01)
*E03D 1/30* (2006.01)

(52) U.S. Cl. ........................ 137/434; 137/357; 137/409; 4/353; 4/394; 4/395; 52/16

(58) Field of Classification Search ................ 137/357, 137/409, 434; 52/16; 4/434, 435, 437, 353, 4/356, 355, 394, 395
See application file for complete search history.

(56) References Cited

U.S. PATENT DOCUMENTS

| | | | |
|---|---|---|---|
| 4,197,597 A | 4/1980 | Toms | |
| 5,059,330 A | 10/1991 | Burkhardt | |
| 5,114,594 A | 5/1992 | Rosebrock et al. | |
| 5,303,728 A | 4/1994 | Senatore | |
| 5,396,745 A | 3/1995 | Klein | |
| 5,429,270 A * | 7/1995 | Tumminia | 4/227.2 |
| 5,533,303 A | 7/1996 | Harvey | |
| 5,681,455 A | 10/1997 | Takai et al. | |
| 5,730,179 A | 3/1998 | Taylor | |
| 6,357,183 B1 * | 3/2002 | Smith | 137/360 |
| 6,526,699 B1 | 3/2003 | Foglio, Sr. | |
| 6,619,312 B2 | 9/2003 | Doiron | |
| 6,702,942 B1 * | 3/2004 | Nield | 210/416.1 |
| 6,887,375 B2 | 5/2005 | Johnson | |
| 6,941,702 B1 | 9/2005 | Abrams et al. | |

* cited by examiner

*Primary Examiner*—Kevin L Lee
(74) *Attorney, Agent, or Firm*—Robert M Hunter

(57) ABSTRACT

An apparatus and method for capturing filtered rainwater during wet weather, storing the filtered rainwater in an elevated storage tank, conveying the filtered rainwater by gravity to a toilet tank and controlling its introduction into the toilet tank. The apparatus preferably comprises an inline filter for installation in a horizontal or sloping section of a rain gutter, a storage tank that is mountable at an elevation higher than the elevation of the toilet tank, water transfer tubing or piping for conveyance of filtered rainwater to the storage tank, water supply tubing or piping for conveyance of stored water to the toilet tank, and a control valve for introducing the stored water into the toilet tank when it is needed. In a preferred embodiment, the components of the apparatus are provided to the consumer in the form of an easily installed kit.

18 Claims, 4 Drawing Sheets

WATER CONSERVATION KIT

CROSS-REFERENCE TO RELATED APPLICATIONS

This application claims the benefit of U.S. Provisional Patent Application No. 60/795,337, filed Apr. 26, 2006, pending, the disclosure of which patent application is incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to water conservation and rainwater harvesting. In particular, the invention relates to capturing rainwater for use in toilet flushing.

Water is essential to the operation of conventional toilets and at current consumption rates, demand will exceed supply in many areas. For many years, inventors have attempted to develop systems that would allow rainwater to be captured and used for toilet flushing.

The background art is characterized by U.S. Pat. Nos. 4,197,597; 5,059,330; 5,114,594; 5,303,728; 5,396,745; 5,533,303; 5,681,455; 5,730,179; 6,357,183; 6,526,699; 6,619,312; 6,887,375 and 6,941,702, the disclosures of which patents are incorporated by reference as if fully set forth herein.

What is needed is a simple, inexpensive system that does not require treatment and pumping of the harvested rainwater or its introduction into the piping network of the building. Such a system would preferably not require electricity or maintenance and would be pleasing in appearance.

BRIEF SUMMARY OF THE INVENTION

The purpose of the invention is to conserve drinking water by capturing and using rain water instead of higher quality drinking water for toilet flushing. Advantages of the invention are that it is relatively inexpensive, is compact and easy to install. Another advantage is that it can supply thirty to fifty percent of the water needed for flushing in many locales. Moreover, its appearance is pleasing and it is easy to maintain.

In a preferred embodiment, the invention is an apparatus and method for capturing filtered rainwater during wet weather, storing the filtered rainwater in an elevated storage tank, conveying the filtered rainwater by gravity to a toilet tank and controlling its introduction into the toilet tank. The apparatus preferably comprises an inline filter for installation in a horizontal or sloping section of a rain gutter, a storage tank that is mountable at an elevation higher than the elevation of the toilet tank, water transfer tubing or piping for conveyance of filtered rainwater to the storage tank, water supply tubing or piping for conveyance of stored water to the toilet tank, and a control valve for introducing the stored water into the toilet tank when it is needed. In a preferred embodiment, the components of the apparatus are provided to the consumer in the form of an easily installed kit.

In use, the invention is preferably set up by installing an inline filter on a gutter that receives rainwater running off the roof of a building, by installing the storage tank on the wall of the building at an elevation that is greater than the elevation of the toilet tank, by installing a control valve in the toilet tank, by connecting the inline filter to the storage tank with water transfer tubing and by connecting the storage tank with the control valve with water supply tubing. Operation of the invention is automatic. When rain water enters the gutter, a portion of the rainfall passes through the inline filter, enters the transfer tubing and is conveyed to the storage tank. When the toilet is flushed, the control valve opens and water flows by gravity from the storage tank into the toilet tank, minimizing the amount of drinking water required to flush the toilet.

In a preferred embodiment, the invention is a water conservation kit for a building comprising a rain gutter having a sloping section between an outlet and a downspout, a building wall, and a toilet having a toilet tank having a back wall a lip and a lid, the kit comprising: an inline filter for installation in the sloping section of the rain gutter, said inline filter comprising a filter body having a bottom, a screen attached to said bottom, and a water catcher disposed below said screen, said inline filter being operative to screen water before it enters said water catcher; a tubing sleeve and a plurality of tubing clips, said tubing clips being operative to secure said tubing sleeve to the downspout, said tubing sleeve having a first end that is attachable to said water catcher and a second end; a slimline storage tank that is mountable on the building wall above the elevation of the lid of the toilet tank, said slimline storage tank having a water inlet to which said second end of said tubing sleeve is attached, an overflow valve, a storage tank outlet and a beauty cover, said overflow valve comprising a float well having a sealing stop, a float disposed in said float well that is urged against said sealing stop only when said storage tank is full, and an air inlet/outlet that allows air to enter and leave said storage tank when said storage tank is not full; a supply tube having a first ending that is connected to said storage tank outlet and a second ending; and a gravity valve that is securable to the toilet tank, said gravity valve comprising a valve inlet that is attached to said second ending, a plunger section having a lower seal, a spherical plunger that is seatable on said lower seal, a pivot point, an adjustable float that is configured to float on the water in the toilet tank, and a float shaft that is pivotable on said pivot point and that transmits the movements of said float to said spherical plunger, said gravity valve being operable to prevent water in said supply tube from entering the toilet tank when the toilet tank is full. Preferably, said gravity valve is a clip-on valve that is securable to the back wall of the toilet tank, said clip-on valve comprising a thin and wide supply section that fits between the lip of the toilet tank and the lid of the toilet tank. Preferably, at least a portion said gravity valve is configured to pass through a hole in the toilet tank. Preferably, at least a portion of said gravity valve is configured to pass over the lip of the toilet tank between a pair of a plurality of spacers that are disposed around the lip of the toilet tank.

In another preferred embodiment, the invention is a water conservation kit for a building comprising a rain gutter having a sloping section between an outlet and a downspout or a jog in the downspout, a wall, and a toilet having a toilet tank having a wall, a lip and a lid, the kit comprising: an inline filter for installation in the sloping section or in the jog in the downspout, said inline filter comprising a filter body having a bottom, a screen attached to said bottom, and a water catcher disposed below said screen; a tubing sleeve having a first end that is attachable to said water catcher and a second end; a storage tank that is mountable on the wall above the elevation of the lid of the toilet tank, said storage tank having a water inlet to which said second end of said tubing sleeve is attached, an overflow valve and a storage tank outlet; a supply tube having a first ending that is connected to said storage tank outlet and a second ending; and a single-action gravity valve that is securable to the toilet tank, said gravity valve comprising a valve inlet that is attached to said second ending and being operable to prevent water in said supply tube from entering the toilet tank when the toilet tank is full. Preferably, said overflow valve comprises: a float well having a sealing stop; a float disposed in said float well that is urged against said sealing stop only when said storage tank is full; and an air inlet/outlet that allows air to enter and leave said storage tank when said storage tank is not full. Preferably, said gravity valve comprises: a valve inlet that is attached to said second ending; and a plunger section having a lower seal, a substantially spherical plunger that is seatable on said lower seal, a pivot point, an adjustable float that is configured to float on the water in the toilet tank, and a float shaft that is pivotable on said pivot point and that transmits the movements of said float to said substantially spherical plunger. Preferably, said gravity valve is a clip-on valve that is securable to the back of the toilet tank, said clip-on valve comprising a thin and wide supply section that fits between the lip and the lid of the toilet tank. Preferably, at least a portion said gravity valve is configured to pass through a hole in the wall of the toilet tank. Preferably, at least a portion of said gravity valve is configured to pass over the lip of the toilet tank between a pair of a plurality of spacers that are disposed around the lip of the toilet tank. Preferably, said screen is a micro-screen comprising a stainless steel alloy wire cloth. Preferably, said storage tank has a multi-tank connection to which an auxiliary storage tank is connected. Preferably, said overflow valve comprises: a supply overflow valve body having an O-ring on it interior surface; and a supply overflow valve float that is disposed in said supply overflow valve body and that is operative to float when water is present in said supply overflow valve body and to close said overflow valve by pressing against said O-ring when said storage tank is full, thereby preventing additional water from entering said storage tank.

In yet another preferred embodiment, the invention is a water conservation kit comprising: an inline filter disposed on a flat section or a sloped section of a downspout, said filter being operative to substantially pass filtered water and to substantially reject solids; a storage tank for storing said filtered water, said storage tank having a water outlet and an air outlet that is adapted to close when said storage tank is full of filtered water, thereby preventing additional filtered water from entering said storage tank; a gravity valve for controlling the introduction of filtered water into a toilet tank that is adapted for containing water, said gravity valve comprising a gravity valve float that floats in the water contained in said toilet tank and a gravity valve body in which a plunger is disposed that moves upward, thereby opening said gravity valve, when said gravity valve float moves downward when the water contained in said toilet tank is used for flushing. Preferably, said gravity valve is adapted to open before a conventional valve opens and introduces clean water from another source into said toilet tank.

In a further preferred embodiment, the invention is an apparatus for conserving water with which to flush a toilet comprising a toilet tank having a water level, said apparatus comprising: means for capturing and filtering rain water to produce filtered rainwater; means for storing said filtered rainwater in a storage tank to produce stored water; means for sensing the water level in the toilet tank and; and means for opening a control valve which allows at least a portion of said stored water to flow by gravity into the toilet tank and refill the toilet tank when a change in the water level indicates that the toilet has been flushed. Preferably, said toilet tanks has a back, a lip and a lid and said means for opening a control valve is a clip-on valve that is securable to the back wall of the toilet tank, said clip-on valve comprising a thin and wide supply section that fits between the lip of the toilet tank and the lid of the toilet tank. Preferably, said means for storing comprises an overflow valve that comprises: a float well having a sealing stop; a float disposed in said float well that is urged against said sealing stop only when said storage tank is full; and an air inlet/outlet that allows air to enter and leave said storage tank when said storage tank is not full.

In yet another preferred embodiment, the invention is a method for conserving water with which to flush a toilet comprising a toilet tank having a water level, said method comprising: a step for capturing and filtering rain water to produce filtered rainwater; a step for storing said filtered rainwater in a storage tank to produce stored water; a step for sensing the water level in the toilet tank and; and a step for opening a control valve which allows at least a portion of said stored water to flow by gravity into the toilet tank and refill the toilet tank when a change in the water level indicates that the toilet has been flushed. In another preferred embodiment, the invention is a method for conserving water with which to flush a toilet comprising a toilet tank having a water level, said method comprising: capturing and filtering rain water to produce filtered rainwater; storing said filtered rainwater in a storage tank to produce stored water; sensing the water level in the toilet tank and; and opening a control valve which allows at least a portion of said stored water to flow by gravity into the toilet tank and refill the toilet tank when a change in the water level indicates that the toilet has been flushed.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL
VIEWS OF THE DRAWINGS

The features of the invention will be better understood by reference to the accompanying drawings which illustrate presently preferred embodiments of the invention. In the drawings.

Figure 1:
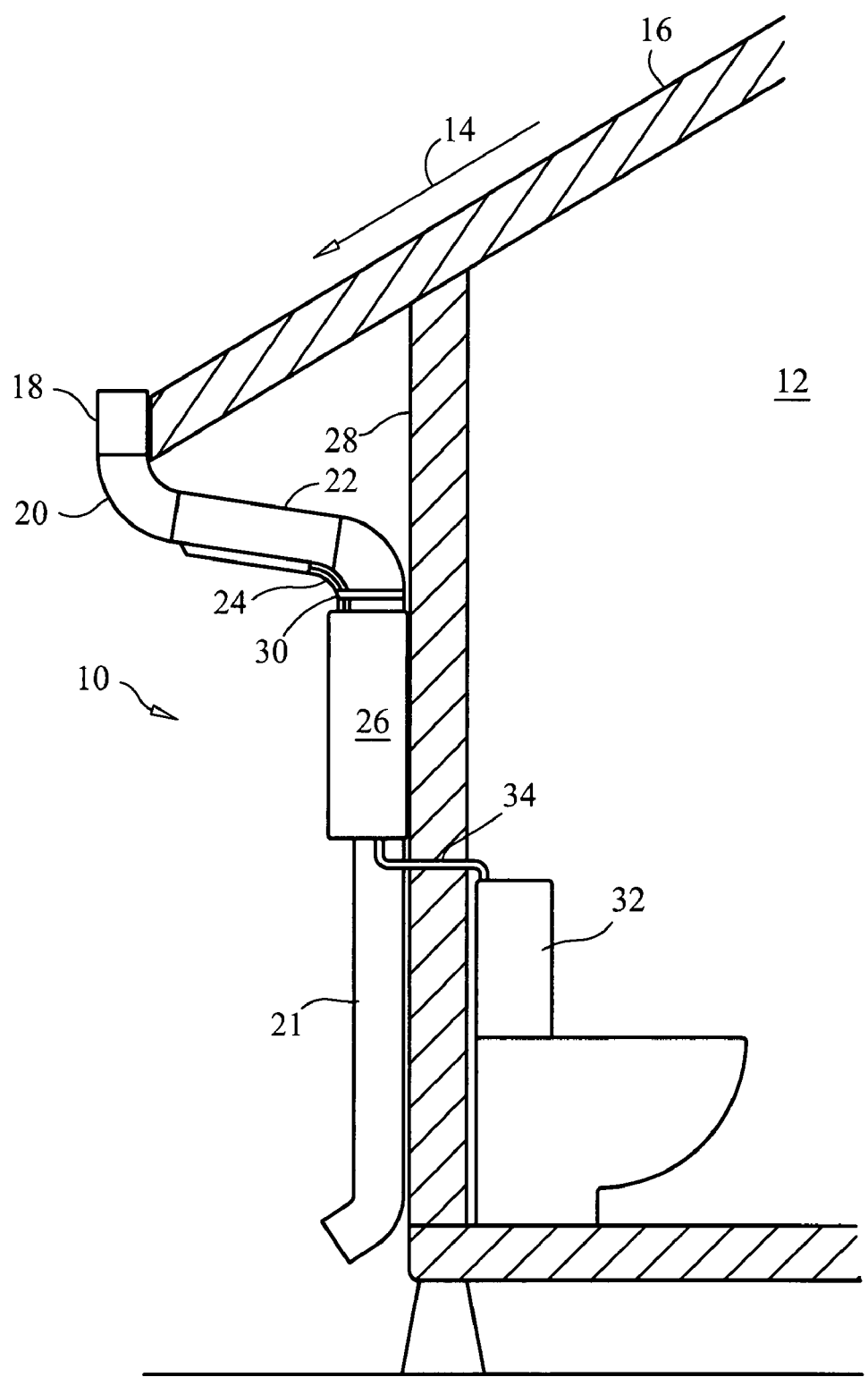
FIG. 1 is an elevation view of a preferred embodiment of the invention installed on a house.

The following reference numerals are used to indicate the parts and environment of the invention on the drawings:

| 10 | kit |
|---|---|
| 12 | house |
| 14 | rainwater |
| 16 | roof |
| 18 | gutter |
| 20 | gutter outlet |
| 21 | downspout |
| 22 | inline filter |
| 24 | transfer tubing |
| 26 | storage tank |
| 28 | building wall |
| 30 | clips |
| 32 | toilet tank |
| 34 | supply tubing |
| 40 | friction connections |
| 42 | filter micro-screen |
| 44 | water catcher |
| 46 | water inlet |
| 48 | supply overflow valve, air outlet |
| 50 | attachment plate |
| 52 | water outlet |
| 54 | multi-tank connection fitting |
| 56 | tank body |
| 58 | supply overflow valve body |
| 60 | supply overflow valve float |
| 62 | supply overflow valve O-ring |
| 63 | air |
| 64 | screened and covered outlets |
| 70 | gravity valve |
| 72 | back wall |
| 74 | gravity valve body |
| 76 | plunger section |
| 77 | pivot point |
| 78 | lower O-ring seal |
| 80 | plunger |
| 82 | float shaft |
| 84 | arm |
| 86 | gravity valve float |
| 90 | stoppers |
| 92 | bottom clip |

DETAILED DESCRIPTION OF THE INVENTION

Referring to FIG. 1, a preferred embodiment of kit 10 is shown installed on house 12. During a rainfall event, rainwater 14 runs off roof 16 and enters gutter 18. Rainwater 14 runs along gutter 18 until it reaches gutter outlet 20. Inline filter 22 of kit 10 is preferably installed on gutter outlet 20 to capture and filter at least a portion of rainwater 14 flowing in gutter outlet 20. The filtered rainwater is preferably conveyed by transfer tubing 24 to storage tank 26 which is mounted on wall 28. In a preferred embodiment, transfer tubing 26 is attached to downspout 21 by means of clips 30. When needed, water stored in storage tank 26 is preferably conveyed to toilet tank 32 by means of supply tubing 34 which perforates wall 28. In an alternative embodiment, appropriate fittings and a plurality of portions of supply tubing 34 are used to convey filtered rainwater to more than one toilet.

Figure 2:
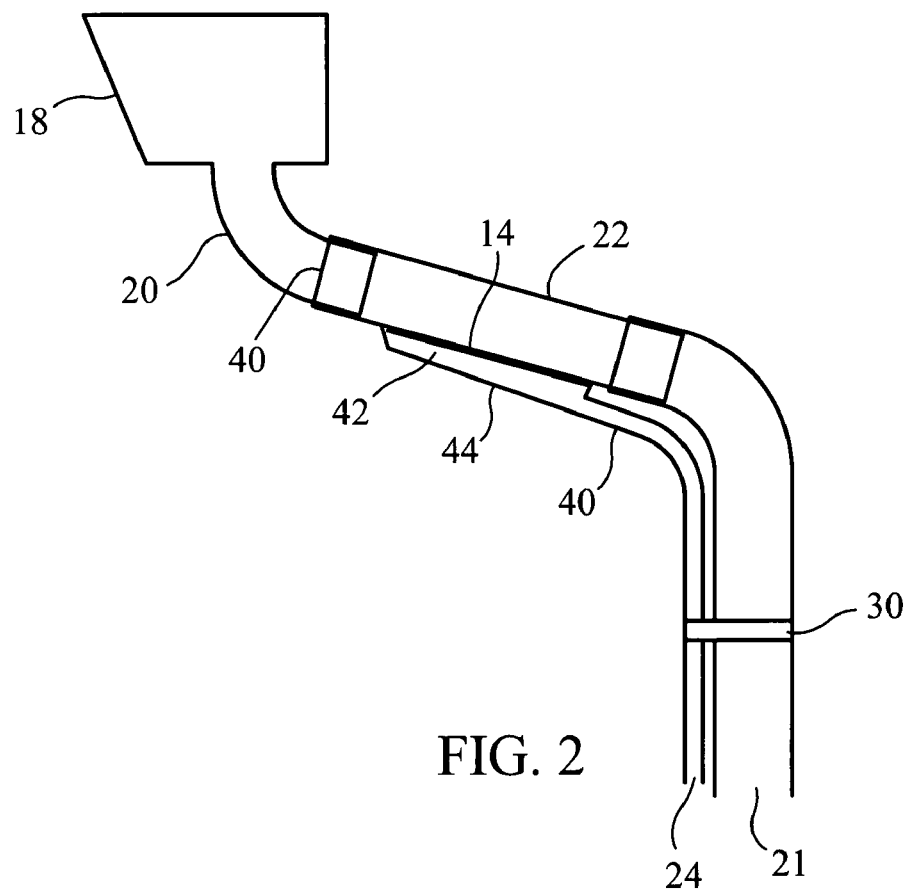
FIG. 2 is an elevation view of a preferred embodiment of the inline filter component of the invention installed on a gutter outlet.

Referring to FIG. 2, inline filter 22 is shown installed on gutter outlet 20. Inline filter 22 is preferably attached to gutter outlet 20 and the other components of downspout 21 by means of a friction (press fit) connections 40. In this embodiment, inline filter 22 comprises filter micro-screen 42 and water catcher 44. Transfer tubing 24 is preferably attached to water catcher 44 by means of another friction connection 40.

In a preferred embodiment, filter micro-screen 42 is capable of deflecting debris into downspout 21 and passing (harvesting) about 70 to 90 percent of the rainwater to which it is exposed to produce substantially clean, particle free filtered water. An example of such a filter micro-screen is square-mesh, plain-weave, 55-mesh Monel® stainless steel alloy wire cloth from Jelliff Corporation of Pompano Beach, Fla. Alternatively, filter micro-screen 42 may be woven using a metal wire of a diameter than when woven produces a wire cloth having about fifty-five holes per inch. In a preferred embodiment, the metal wire is about 0.0085 inch in diameter. Inline filter 22 is preferably between installed gutter outlet 20 and the first elbow at the top of downspout 21, or in the case of a vertical downspout, in a jog in the downspout, that is, a portion of downspout 22 that is disposed substantially horizontally between two 45 degree elbows. Clips 30 are used to attach transfer tubing 24 to downspout 21 so that installed kit 10 has a clean and orderly appearance.

Figure 3:
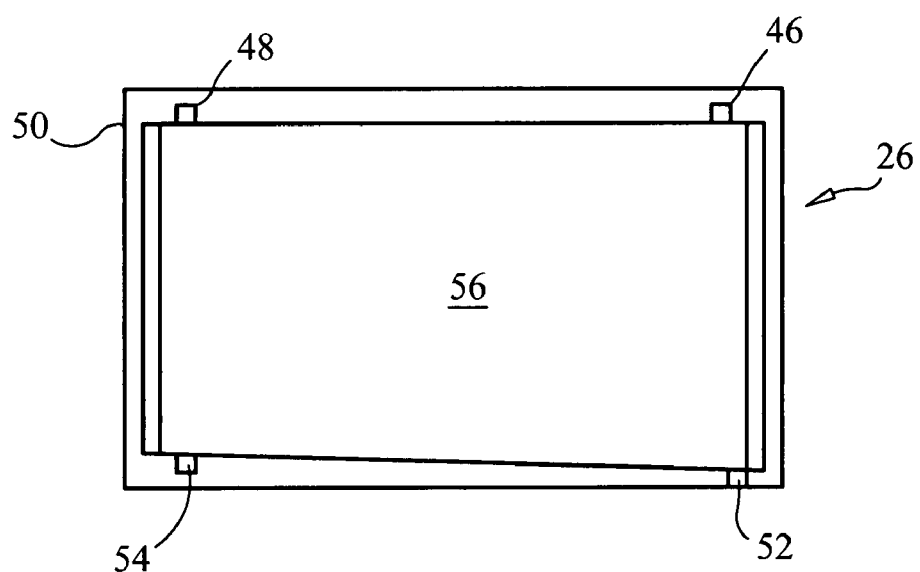
FIG. 3 is a front elevation view of a preferred embodiment of the storage tank component of the invention.
Figure 4:
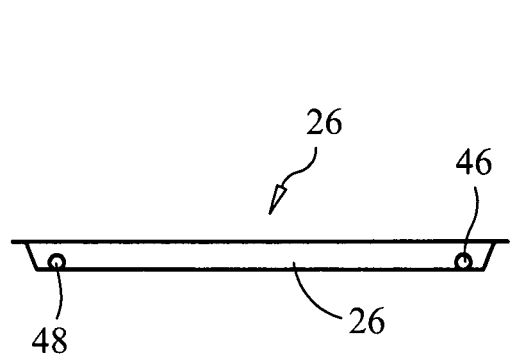
FIG. 4 is a plan view of a preferred embodiment of the storage tank component of the invention.
Figure 5:
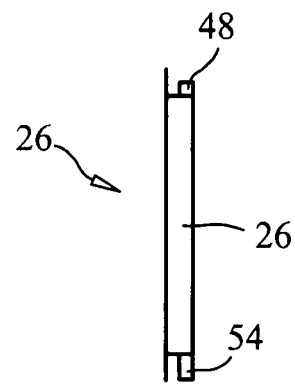
FIG. 5 is a side elevation view of a preferred embodiment of the storage tank component of the invention.

Referring to FIGS. 3 through 5, storage tank 26 of a preferred embodiment of the invention is presented. Storage tank 26 preferably comprises water inlet 46 to which transfer tubing 24 connects, supply overflow valve or air outlet 48, attachment plate 50 by which means storage tank 26 is attached to wall 28, water outlet 52 to which supply tubing 34 is attached, and multi-tank connection fitting 54 to which interconnection tubing is connected if more than one storage tank is needed. In a preferred embodiment, storage tank 26 is about 5.5 inches thick, can hold about 55 gallons of filtered rainwater and its bottom slopes down toward water outlet 52. In a preferred embodiment, attachment plate 50 is about 80 inches wide and 48 inches tall and extends about four inches beyond the front wall of tank body 56.

In a preferred embodiment, storage tank 26 is a slimline storage tank in that it is long and wide, but thin. Preferably, threaded connections are provided on the top and bottom of each tank. Beauty strips (not shown) are preferably used to cover the inlets and outlets of storage tank 26 to produce a streamlined and attractive look.

In an alternative embodiment, a plurality of interconnected storage tanks 26 are provided. Alternatively, drinking water can be introduced to one or more of the tanks during periods of reduced rainfall. In some embodiments, a pump is used to lift filtered rainwater to floors above the elevation of the storage tanks or to supply filtered rainwater under pressure to a low-flush toilet. Water stored in storage tanks can also be used as an emergency source of water supply during disasters. Several tanks (e.g., a primary storage tank and a plurality of auxiliary storage tanks) may be connected together to increase the water storage capacity of the system.

Figure 6:
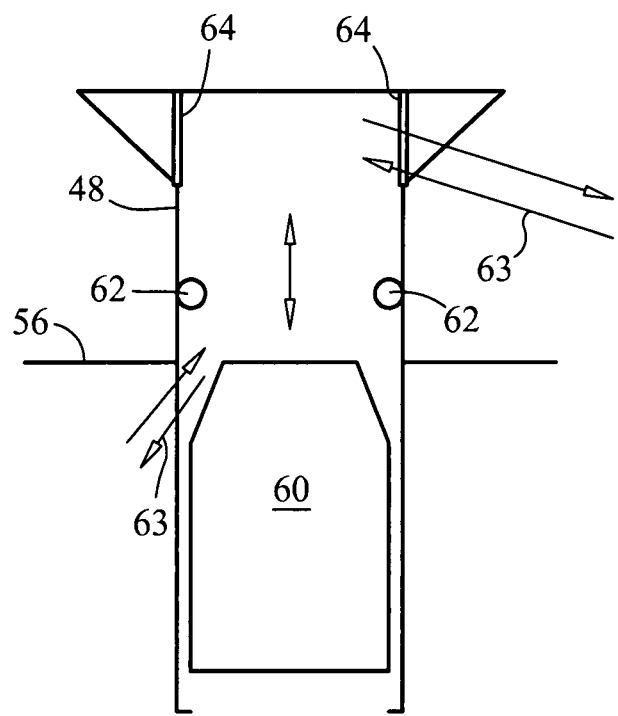
FIG. 6 is an elevation view of a preferred embodiment of the supply overflow valve of the storage tank component of the invention.

Referring to FIG. 6, a preferred embodiment of supply overflow valve 48 of storage tank 26 is shown. Supply overflow valve 48 is attached to the top of tank body 56 and preferably comprises supply overflow valve body 58 within which supply overflow valve float 60 floats when storage tank 26 is approaching the full condition. When storage tank 26 is full of filtered rainwater, supply overflow valve float 60 presses against O-ring 62, preventing any more rainwater from entering storage tank 26. When storage tank 26 is full, transfer tubing 24 fills with filtered rainwater and any new rainwater is spilled back into downspout 21. When storage tank 26 is not full, supply overflow valve float 60 does not press against supply overflow valve O-ring 62 and air 63 inside and above the water in storage tank 26 passes through valve body 58 and exits through screened and covered outlets 64.

Figure 7:
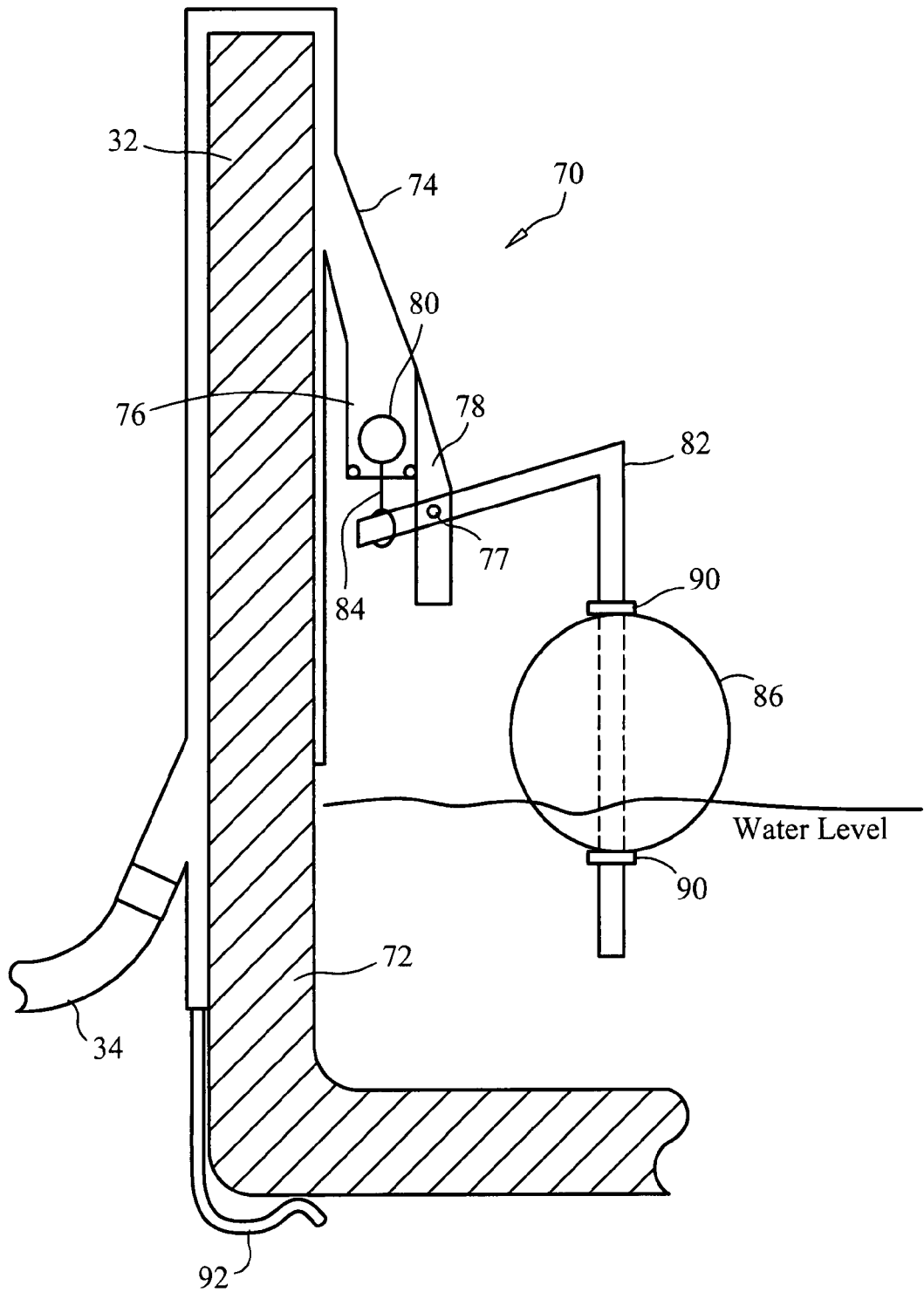
FIG. 7 is an elevation view of a preferred embodiment of the gravity valve component of the invention installed in a toilet tank.

Referring to FIG. 7, a partial view of toilet tank 32 is presented with gravity valve 70 installed thereon. Gravity valve 70 is installed over back wall 72 of toilet tank 32 and is attached to supply tubing 34. Gravity valve 70 comprises gravity valve body 74 having a plunger section 76 and pivot point 77, lower O-ring seal 78 in plunger section 76, plunger 80, float shaft 82 to which plunger 80 is connected by arm 84, and gravity valve float 86.

In a preferred embodiment, gravity valve 70 clips onto the back surface or wall of toilet tank 32 and traverses the lip of tank 32. Gravity valve body 74 is provided with a thin and wide portion that presents a minimal obstruction to closing the lid of toilet tank 32. In an alternative embodiment (not shown), a grinding tool is used to notch the back wall of toilet tank 32 to allow gravity valve body 74 to be installed in a way that does not prevent the lid from being placed on toilet tank 32. In another embodiment, one or more spacers are installed along the lip of toilet tank 32 except where the wide portion of gravity valve 70 passes over the lip, thereby enabling installation of kit 10 without grinding a hole or notch the tank wall. In another alternative embodiment (not shown), a small (e.g., 0.75 inch diameter) hole is drilled in the bottom or side wall of toilet tank 32 (or a new tank is provided having such a hole) through which supply tube 34 passes, to allow gravity valve 70 to be installed inside toilet tank 32.

When toilet tank 32 is full, gravity valve float 86 floats to a position that causes float shaft 82 to pivot around pivot point 82 and pull downward on arm 84. This causes plunger 80 to press against lower O-ring seal 78 and prevents any more filtered water from entering toilet tank 32. When the toilet is flushed and toilet tank 32 empties, gravity valve float 86 falls causing float shaft to pivot around pivot point 77 and arm 84 to push upward on plunger 80, opening gravity valve 70 and allowing filtered water to move down supply tubing 34 and enter and refill toilet tank 32. In a preferred embodiment, gravity valve float 86 is held in position on float shaft 80 by stoppers 90 and the position of gravity valve float 86 on float shaft 80 can be adjusted by sliding it and stoppers 90 up or down float shaft 80. Installed kit 10 preferably supplies rainwater to toilet tank 32 at the same time that water is being supplied to toilet tank 32 by the drinking water system. Gravity valve float 86 is preferably adjusted to shut off gravity valve 70 just before the drinking water supply valve that is normally used to control the refilling toilet tank 32 shuts off.

The foregoing disclosure describes a simple, inexpensive and virtually maintenance free system for capturing rainwater for use in flushing toilets. Many variations of the invention will occur to those skilled in the art. Some variations include the incorporation of other valve designs. Other variations call for the incorporation of multiple storage tanks, with or without the use of filtered rainwater pumps. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of the invention.

What is claimed is:

1. A water conservation kit for a building comprising a rain gutter having a sloping section between an outlet and a downspout, a building wall, and a toilet having a toilet tank having a back wall, a lip and a lid, the kit comprising:

an inline filter for installation in the sloping section of the rain gutter, said inline filter comprising a filter body having a bottom, a screen attached to said bottom, and a water catcher disposed below said screen, said inline fitter being operative to screen water before it enters said water catcher;

a tubing sleeve and a plurality of tubing clips, said tubing clips being operative to secure said tubing sleeve to the downspout, said tubing sleeve having a first end that is attachable to said water catcher and a second end;

a slimline storage tank that is mountable on the building wall above the elevation of the lid of the toilet tank, said slimline storage tank having a water inlet to which said second end of said tubing sleeve is attached, an overflow valve, a storage tank outlet and a beauty cover, said overflow valve comprising a float well having a sealing stop, a float disposed in said float well that is urged against said sealing stop only when said storage tank is full, and an air inlet/outlet that allows air to enter and leave said storage tank when said storage tank is not full;

a supply tube having a first ending that is connected to said storage tank outlet and a second ending; and a gravity valve that is securable to the toilet tank, said gravity valve comprising a valve inlet that is attached to said second ending, a plunger section having a lower seal, a spherical plunger that is seatable on said lower seal, a pivot point, an adjustable float that is configured to float on the water in the toilet tank, and a float shaft that is pivotable on said pivot point and that transmits the movements of said float to said spherical plunger, said gravity valve being operable to prevent water in said supply tube from entering the toilet tank when the toilet tank is full.

2. The water conservation kit of claim 1 wherein said gravity valve is a clip-on valve that is securable to the back wall of the toilet tank, said clip-on valve comprising a thin and wide supply section that fits between the lip of the toilet tank and the lid of the toilet tank.

3. The water conservation kit of claim 1 wherein at least a portion of said gravity valve is configured to pass through a hole in the toilet tank.

4. The water conservation kit of claim 1 wherein at least a portion of said gravity valve is configured to pass over the lip of the toilet tank between a pair of a plurality of spacers that are disposed around the lip of the toilet tank.

5. A water conservation kit for a building comprising a rain gutter having a sloping section between an outlet and a downspout or a jog in the downspout, a wall, and a toilet having a toilet tank having a wall, a lip and a lid, the kit comprising:

an inline filter for installation in the sloping section or in the jog in the downspout, said inline filter comprising a filter body having a bottom, a screen attached to said bottom, and a water catcher disposed below said screen;

a tubing sleeve having a first end that is attachable to said water catcher and a second end;

a storage tank that is mountable on the wall above the elevation of the lid of the toilet tank, said storage tank having a water inlet to which said second end of said tubing sleeve is attached, an overflow valve and a storage tank outlet;

a supply tube having a first ending that is connected to said storage tank outlet and a second ending; and a single-action gravity valve that is securable to the toilet tank, said gravity valve comprising a valve inlet that is attached to said second ending and being operable to prevent water in said supply tube from entering the toilet tank when the toilet tank is full.

6. The water conservation kit of claim 5 wherein said overflow valve comprises:
- a float well having a sealing stop;
- a float disposed in said float well that is urged against said sealing stop only when said storage tank is full; and
- an air inlet/outlet that allows air to enter and leave said storage tank when said storage tank is not full.

7. The water conservation kit of claim 5 wherein said gravity valve comprises:
- a valve inlet that is attached to said second ending; and
- a plunger section having a lower seal, a substantially spherical plunger that is seatable on said lower seal, a pivot point, an adjustable float that is configured to float on the water in the toilet tank, and a float shaft that is pivotable on said pivot point and that transmits the movements of said float to said substantially spherical plunger.

8. The water conservation kit of claim 5 wherein said gravity valve is a clip-on valve that is securable to the back of the toilet tank, said clip-on valve comprising a thin and wide supply section that fits between the lip and the lid of the toilet tank.

9. The water conservation kit of claim 5 wherein at least a portion of said gravity valve is configured to pass through a hole in the wall of the toilet tank.

10. The water conservation kit of claim 5 wherein at least a portion of said gravity valve is configured to pass over the lip of the toilet tank between a pair of a plurality of spacers that are disposed around the lip of the toilet tank.

11. The water conservation kit of claim 5 wherein said screen is a micro-screen comprising a stainless steel alloy wire cloth.

12. The water conservation kit of claim 5 wherein said storage tank has a multi-tank connection to which an auxiliary storage tank is connected.

13. The water conservation kit of claim 5 wherein said overflow valve comprises:
- a supply overflow valve body having an O-ring on its interior surface; and
- a supply overflow valve float that is disposed in said supply overflow valve body and that is operative to float when water is present in said supply overflow valve body and to close said overflow valve by pressing against said O-ring when said storage tank is full, thereby preventing additional water from entering said storage tank.

14. A water conservation kit comprising:
- an inline filter disposed on a flat section or a sloped section of a downspout, said filter being operative to substantially pass filtered water and to substantially reject solids;
- a storage tank for storing said filtered water, said storage tank having a supply overflow valve that is adapted to close when said storage tank is full of filtered water, thereby preventing additional filtered water from entering said storage tank;
- a gravity valve for controlling the introduction of filtered water into a toilet tank that is adapted for containing water, said gravity valve comprising a gravity valve float that floats in the water contained in said toilet tank and a gravity valve body in which a plunger is disposed that moves upward, thereby opening said gravity valve, when said gravity valve float moves downward when the water contained in said toilet tank is used for flushing.

15. The water conservation kit of claim 14 wherein said gravity valve is adapted to open before a conventional valve opens and introduces clean water from another source into said toilet tank.

16. An apparatus for conserving water with which to flush a toilet comprising a toilet tank having a water level, said apparatus comprising:
- means for capturing and filtering rain water to produce filtered rainwater, said means for capturing and filtering comprising an inline filter comprising a filter body having a bottom, a screen attached to said bottom and a water catcher disposed below said screen;
- means for storing said filtered rainwater in a storage tank to produce stored water;
- means for sensing the water level in the toilet tank and; and
- means for opening a control valve which allows at least a portion of said stored water to flow by gravity into the toilet tank and refill the toilet tank when a change in the water level indicates that the toilet has been flushed.

17. An apparatus for conserving water with which to flush a toilet comprising a toilet tank having a water level, said apparatus comprising:
- means for capturing and filtering rain water to produce filtered rainwater;
- means for storing said filtered rainwater in a storage tank to produce stored water;
- means for sensing the water level in the toilet tank and; and
- means for opening a control valve which allows at least a portion of said stored water to flow by gravity into the toilet tank and refill the toilet tank when a change in the water level indicates that the toilet has been flushed;
- wherein the toilet tank has a back, a lip and a lid and said means for opening a control valve is a clip-on valve that is securable to the back wall of the toilet tank, said clip-on valve comprising a thin and wide supply section that fits between the lip of the toilet tank and the lid of the toilet tank.

18. An apparatus for conserving water with which to flush a toilet comprising a toilet tank having a water level, said apparatus comprising:
- means for capturing and filtering rain water to produce filtered rainwater;
- means for storing said filtered rainwater in a storage tank to produce stored water;
- means for sensing the water level in the toilet tank and; and
- means for opening a control valve which allows at least a portion of said stored water to flow by gravity into the toilet tank and refill the toilet tank when a change in the water level indicates that the toilet has been flushed;
- wherein said means for storing comprises an overflow valve that comprises:
  - a float well having a sealing stop;
  - a float disposed in said float well that is urged against said sealing stop only when said storage tank is full; and
  - an air inlet/outlet that allows air to enter and leave said storage tank when said storage tank is not full.

* * * * *